United States Patent
Robinson et al.

(10) Patent No.: US 10,416,269 B2
(45) Date of Patent: Sep. 17, 2019

(54) DISAMBIGUATED DIRECTION FINDING

(71) Applicant: Raytheon Company, Waltham, MA (US)

(72) Inventors: Ian S. Robinson, Redondo Beach, CA (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 350 days.

(21) Appl. No.: 15/492,712

(22) Filed: Apr. 20, 2017

(65) Prior Publication Data

US 2018/0306888 A1  Oct. 25, 2018

(51) Int. Cl.
*G01S 3/48* (2006.01)
*G01S 3/46* (2006.01)

(52) U.S. Cl.
CPC . *G01S 3/48* (2013.01); *G01S 3/46* (2013.01)

(58) Field of Classification Search
CPC ..... G01S 3/48; G01S 3/46; G01S 3/40; G01S 1/02; G01S 5/02; H04M 3/533; H04W 4/12
USPC ......................................................... 342/419
See application file for complete search history.

(56) References Cited

U.S. PATENT DOCUMENTS

| | | | |
|---|---|---|---|
| 5,724,047 A | 3/1998 | Lioio et al. | |
| 2006/0114157 A1 | 6/2006 | Kolanek et al. | |
| 2017/0201859 A1* | 7/2017 | Banerjea | H04W 4/80 |
| 2018/0074188 A1* | 3/2018 | Polo | G01S 5/00 |

FOREIGN PATENT DOCUMENTS

GB   2191650 A   12/1987

OTHER PUBLICATIONS

International Search Report and Written Opinion from related PCT Application No. PCT/US2017/064991 dated Mar. 21, 2018.

* cited by examiner

*Primary Examiner* — Harry K Liu
(74) *Attorney, Agent, or Firm* — Burns & Levinson LLP; Joseph M. Maraia (57) ABSTRACT

Methods and systems for determining an angle of arrival (AoA) of a RF emitter signal utilizing phase comparisons between pairs of antennas from among two closely spaced antenna elements and a third antenna element fixedly positioned more distant, and a combination of TDOA and PI techniques, to resolve PI ambiguities. Overlapping AoA ambiguity patterns with different angular spacings may be resolved by TDOA techniques. A span of TDOA AoA possibilities is obtained, centered at a solution to a TDOA angle calculation and bounded by a known TDOA measurement error range.

10 Claims, 8 Drawing Sheets

DISAMBIGUATED DIRECTION FINDING

BACKGROUND

1. Technical Field

The present disclosure is related to RF emitter direction finding (DF) methods, and more particularly, to methods that estimate the angle of arrival (AoA) of an RF signal using dual baseline interferometry, and time difference techniques to resolve phase ambiguities to provide for unambiguous AoA estimation.

2. Discussion of Related Art

Electronic support and radar warning receiver systems have an increasing need to precisely find AoA of RF emitters, including frequency agile emitters in emitter dense environments, using small numbers of RF emitter signal samples (e.g., time segments, pulses, etc.)

Three DF techniques are typically used with widely spaced antennas. Time difference of arrival (TDOA) DF may cover up to 180° unambiguously, since time delay between two antennas is monotonic with respect to geometric angle, but TDOA from provides relatively low AoA precision. Amplitude comparison DF generally provides a similarly coarse AoA precision.

Frequency difference of arrival (FDOA) techniques typically require stable emitter pulse signal frequencies, higher SNR, and longer collection times (e.g., seconds versus one or a few pulses for interferometry), thus limiting the number of threats that can be simultaneously geolocated and limiting applicability to threats with a constant waveform.

A more precise DF approach is known as phase interferometry (PI). According to this technique, a pair of antenna elements are separated by a distance "d" and independently receive the transmitted signal. To determine azimuthal AoA of a signal, the antennas would be positioned on the y axis; to determine elevation angles, they would lie on the z axis. For the azimuth case, a plane wave propagating toward an aircraft, and arriving at an angle θ from boresight (the x axis) is received by each of the two antennas. A phase difference ΔΦ between the signals received by the two antennas is expressed as $$\Delta\Phi = \frac{2\pi S \sin\theta}{\lambda},$$

where λ is the wavelength of the emitter signal propagating from the unknown angular location and S is the antenna spacing. The plane wave travels an extra distance to reach one antenna as compared to the other antenna, thus the phase of the signal received by the second antenna lags accordingly. The respective phases of the two received signals are compared then frequency detected, with the results supplied to a processor where the azimuth angle θ of the radiation source is readily computed. The primary drawback of the PI approach is that more than one angular position of the target emitter can produce the same phase relationship between the signals received by the two antennas when the antenna spacing is greater than half the wavelength of the signal. Consequently, ambiguities in angular position will result with the two antenna approach. It is impossible to achieve unambiguous high precision AoA measurements from an unknown direction and reasonable frequency coverage using a single baseline (two-element) interferometer unless there is a priori information about the emitter's angular location. In traditional interferometry, the spacing between the most distant antennas can be tens, hundreds or even thousands of emitter RF signal wavelengths long. These systems achieve extraordinary angular resolution but require a priori information about the emitter location to avoid ambiguities. A common solution is to employ multiple (e.g., 4-6) dedicated, irregularly spaced antennas to solve the ambiguity problem and provide fine resolution AoA for a signal from an unknown direction, which is achieved by careful design of antenna baseline spacings and comparing electrical phase between the several pairs of antennas. Four to six antennas are used, with the number increasing as the spacing between the most distant antennas increases, to provide a wide (e.g. factor of nine) ratio of lowest frequency of operation to highest frequency. If employed on an aircraft, where 360° situational awareness is required, then one set of antennas and receivers will be needed for each quadrant (in azimuth).

Once the ambiguities are eliminated, an AoA accuracy of traditional PI systems better than 0.1° has been reported. Wider spacings are desirable as the precision of AoA is improved with wider spacing. Reduced spacings have less precise AoA measurements but are employed as finding adequate installation locations many widely spaced antennas may render this type of system impractical, and more so for aircraft platforms.

U.S. Pat. No. 5,724,047, issued on Mar. 3, 1998 to Lioio, which is hereby incorporated by reference, teaches a precise DF system for making precision AoA estimates for a signal received through two spaced apart antenna elements, employing PI to determine a precise AoA with numerous ambiguities that are resolved using TDOA and pre-detection correlation techniques. The method disclosed therein was directed to low frequencies (large wavelengths), and operates on an assumption that the correct PI AoA solution is the one closest to (the single, coarse) TDOA AoA. However, for antenna spacing of greater than 3/2 times the received wavelength, where 3 or more ambiguities exist, the AoA solution provided by that technique is more likely to be incorrect than correct. Thus, methods and systems for precise DF are desired without the aforementioned drawbacks. For example, a precise DF is desired that minimizes the number of antennas and associated receivers, while providing a wide operating bandwidth and providing 360° coverage and can quickly (using as few as one pulse) find AoA solutions for pulses received from emitters, including frequency agile emitters in dense emitting environments. A method for selecting baseline antenna element spacings in such a way as to maximize precision while avoiding ambiguities is also needed. It would also be desirable to reduce and identify the possible errors associated with any ambiguous AoA solutions generated. Further, it would be additionally desirable to provide such improved DF capabilities to antenna systems already existing on many types of aircraft.

SUMMARY

Precision DF methods and systems are described for determining precise estimates of AoA of one or more RF signals (e.g., signal pulses) relative to a system antenna array upon which the signal(s) are incident. In one embodiment, legacy antenna arrays comprising three of more antenna elements may be retrofit for improved, unambiguous (or predefined ambiguity error) highly accurate AoA measurements.

In one embodiment systems and methods are provided for determining an unambiguous AoA estimate for one or more RF signals received from an emitter at an antenna array. First, second and third signal components of a first RF signal may be received at corresponding first, second and third antenna elements of the array at a common time. The first and second antenna elements are fixedly spaced apart more closely to each other than to the third antenna element. One or more processors may determine one or more features of the received first RF signal, including a first phase difference between corresponding phases of the first and second signal components, a second phase difference between corresponding phases of the first and third signal components, and a TDOA between the first and third signal components, where the TDOA has a known measurement error range. The processor may then perform a TDOA angle calculation using the computed TDOA, in order to obtain a span of TDOA AoA possibilities centered at a solution to the TDOA angle calculation and bounded by the known TDOA measurement error range. From this bounded set of AoA solutions, the processor can determine the unambiguous AoA estimate.

In another embodiment, the processor may calculate an envelope of wrapped phase errors using PI based on the first and second phase differences in the received signal components, and within the span of TDOA AoA possibilities. The processor may determine the unambiguous AoA estimate as being associated with a minimum phase error within the wrapped phase errors envelope. Additional unambiguous AoA estimates may be determined in order to obtain a refined AoA solution.

The spacings among the first, second and third antenna elements may be selected such that the ambiguities in AoA resulting from the closer pair of antennas are more widely spaced than the error in the TDOA angle estimate, and the ambiguities of the more distant pair of antennas (e.g, one of the closely spaced first or second antenna elements and the remote third antenna element) are spaced more widely than the error in AoA resulting from the more closely spaced pair of antenna elements (i.e., first and second antenna elements).

The antenna spacings may be selected in accordance with $$\frac{\lambda}{s_{TD}}\left(\frac{\sigma_\phi}{2\pi}\right) < \frac{\lambda}{s_{PI}}\left(\frac{\sigma_\phi}{2\pi}\right) < \frac{\lambda}{s_{TD}} \quad (1)$$

wherein $S_{TD}$ represents the largest spacing between any two of the first antenna element, second antenna element, and third antenna elements, $S_{PI}$ represents a smallest spacing between any two of the first antenna element, second antenna element, and third antenna elements, $\sigma_\phi$ represents a known phase measurement error of the antenna array, and $\lambda$ is the wavelength of the received signal components.

The antenna elements may be fixedly positioned on a moveable platform, such as upon an aircraft or other vehicle. The closely spaced first and second antenna elements may be positioned in a first quadrant of the aircraft, while the third antenna elements may be configured in a distinct quadrant.

It is to be understood that the summary, drawings, and detailed description are not restrictive of the scope of the inventive concept described herein.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

DETAILED DESCRIPTION

The following discussion of embodiments of DF methods and systems is merely exemplary in nature, and is in no way intended to limit the disclosed embodiments or their applications or uses. Alternatives to the embodiments disclosed may be devised without departing from the scope of the disclosure. For example, the discussion below may particularly refer to a three-antenna linear array using two more closely spaced antennas and a third antennas more distant and TDOA techniques. However, as will be appreciated by those skilled in the art, in alternate embodiments, the method and systems may utilize antennas in each quadrant of an aircraft, so as to provide full 360° field of view. Further, the RF signals that are described in the following exemplary embodiments may be referred to as pulsed signals; however this is by no means intended to limit the scope of the disclosure to such signals. In addition, variations in the methods may occur in order to accommodate the presence of low phase noise or high phase noise in the received RF signal. Further, several embodiments are described in terms of sequences of actions to be performed by, for example, by a processor. It will be recognized that various actions described herein can be performed by specific circuits (e.g., application specific integrated circuits (ASICs), by program instructions being executed by one or more processors, or by a combination of both.

Well-known elements of technologies associated with the embodiments will not be described in detail, or will be omitted, so as not to obscure the relevant details of the novel methods and apparatus. The word "exemplary" is used herein to mean "serving as an example, instance, or illustration." Any embodiment described herein as "exemplary" is not necessarily to be construed as preferred or advantageous over other embodiments. Likewise, the term "embodiment" and the descriptive language associated with each use of the term do not require that all embodiments include the discussed feature, limitation, advantage or mode of operation. As used herein, the singular forms "a", "an" and "the" are intended to include the plural forms as well, unless the context clearly indicates otherwise. It will be further understood that the terms "comprises", "comprising", "having", "includes" and/or "including", when used herein, specify the presence of stated features, steps, operations, elements, and/or components, but do not preclude the presence or addition of one or more other features, steps, operations, elements, components, and/or groups thereof. Further, the phrase "based on" is intended to mean "based, at least in part, on" unless explicitly stated otherwise.

In accordance with the methods and systems of this disclosure, dual baseline interferometry and TDOA techniques are combined to find precise and unambiguous emitter AoA solutions. Comparing phases between three antennas receiving corresponding components of an RF emitter signal at a common time, and combining TDOA and PI solutions, allows resolution of the PI ambiguities and achievement of precise emitter AoA from an unknown direction. Because the spacings of the two pairs of antennas are different, the AoA ambiguity patterns have different angular spacings. The overlaps of these patterns are spread more widely than the individual ambiguity patterns, and the resulting widely spaced ambiguities can be resolved by further comparison of AoA derived by TDOA techniques.

Figure 1:
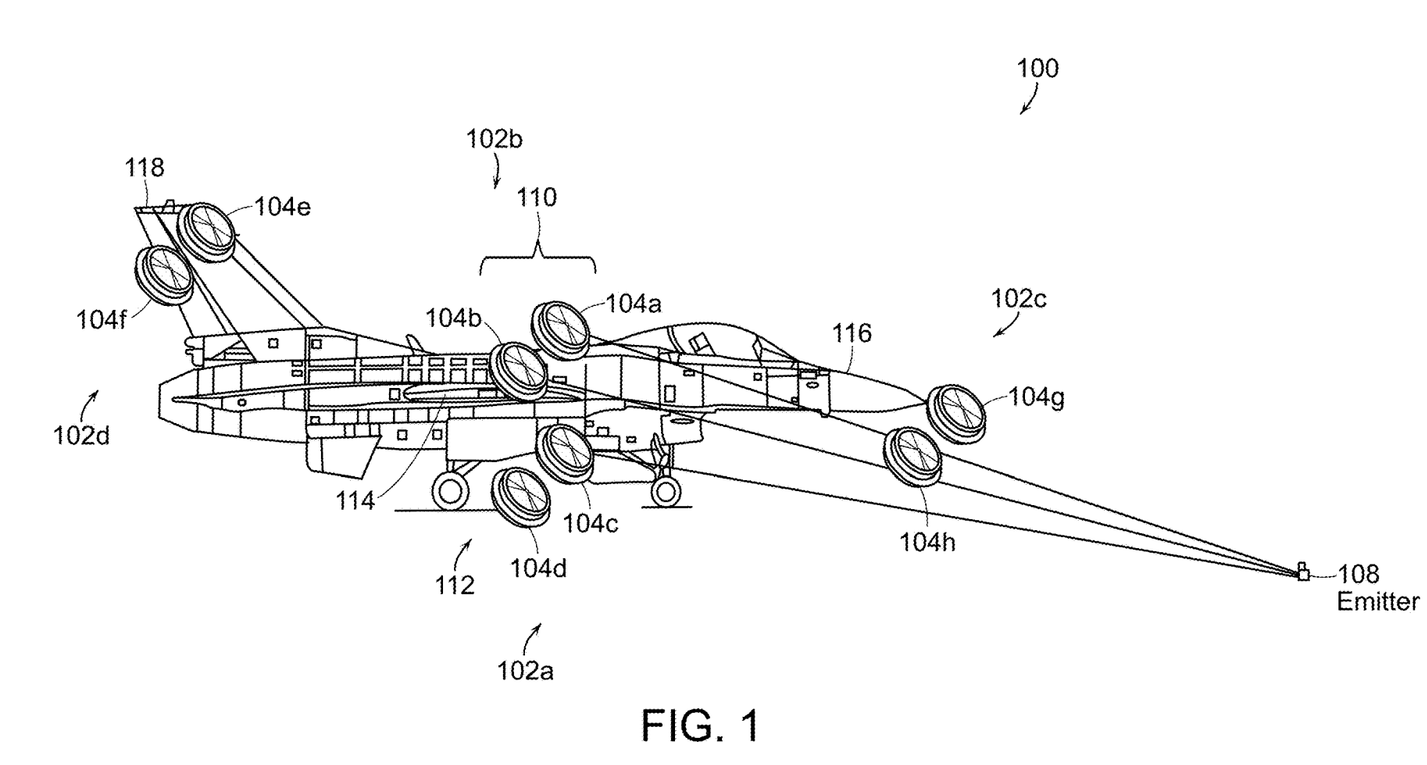
FIG. 1 is an illustration of an exemplary aircraft configured with multiple antenna elements for receiving emitter RF signals.

The combination of dual baseline TDOA techniques allows unambiguous precision angle measurements to be made using a single pulse on emitters spanning over multiple octaves of frequency with fewer antennas than conventional systems, such as a single set of three spaced apart antenna elements (antenna spacings design guidance is provided below). With reference to FIG. 1, a traditional interferometer system installed on a moveable platform such as an aircraft 100 would require four or more antennas per quadrant 102a-102d to provide multiple octaves of frequency coverage and unambiguous AoA per quadrant 102a-102d. In contrast, the disclosed embodiments enable the use of only three of antennas 104a-104h, wherein the utilized antennas may be more widely spaced than antennas of prior systems, enabling a configuration of two antennas (e.g., 104a, 104b) per quadrant (e.g., 102a). The wider spacing 106 of the furthest antennas (e.g., between antennas 104g, 104h and 104e) can provide finer AoA solutions (4-10 times better than existing systems and methods), over a 360° field of view, for a large number of emitters, such as emitter 108. The methods can provide precise AoA solutions for stable emitters using a single pulse.

Such methods and systems may comprise an integral component of, or provide AoA information to, electronic support (ES) and/or radar warning receiver (RWR) systems. Antenna elements 104a and 104b are shown integrated into station 110 and spaced apart by a distance shorter than the distance between either antenna 104a, 104b and antenna element 104c, which is part of antenna station 112. Antenna elements 104a-104c are shown each receiving at a common time components of an RF signal emitted from emitter 108. Other antenna elements 104d-104h, located on the wings 114, nose 116 and/or tail 118 of aircraft 100, could alternatively, or additionally be utilized. These positions may allow the simplest physical installation and provide the best unobstructed field of view.

Figure 2:
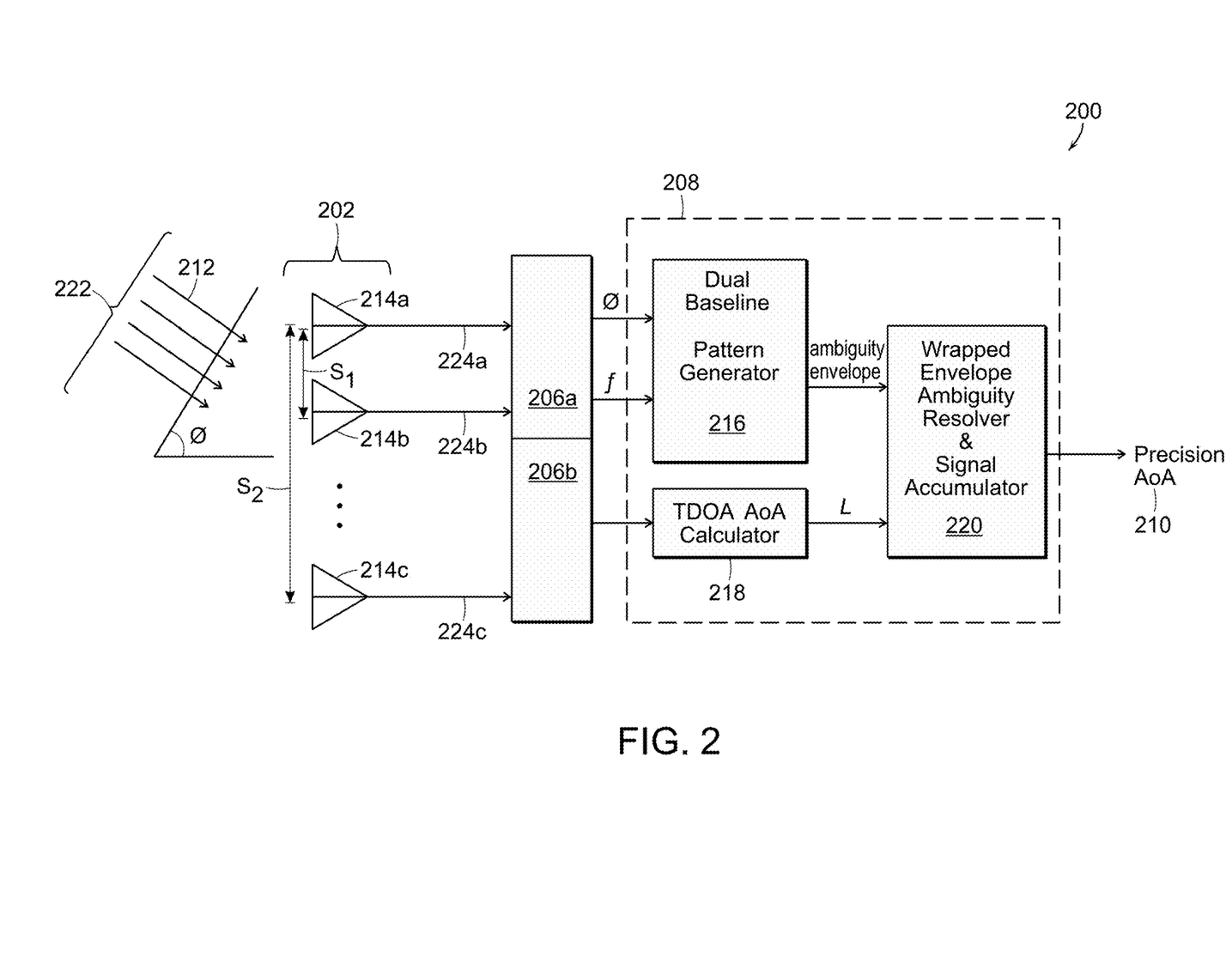
FIG. 2 is an illustration functional block diagram of an exemplary system for improved AoA DF in accordance with an embodiment of the disclosure.

FIG. 2 is a generalized functional block diagram of an exemplary DF system 200, comprising an antenna array 202, a plurality of receivers 206a, 206b, and one or more signal processors 208 for providing a precision AoA estimate 210 of RF (e.g., pulse) signals 212 incident on antenna elements 214a, 214b and 214c of antenna array 202. Signal processor (s) 208 may comprise a dual baseline interferometer ambiguity pattern generator 216, a TDOA calculator 218, and an ambiguity resolver and signal accumulator 220. First antenna element 214a and second antenna element 214b are fixedly spaced apart by a distance $s_1$, which is less than the fixed distance $s_2$ between first antenna element 214a and third antenna element 214c, which on aircraft 100, may be many meters. First antenna element 214a and second antenna element 214b are utilized in generating initial ambiguous AoA estimates while first antenna element 214a and third antenna element 214c are used in generating AoA estimates and TDOA AoA estimates. The antennas 214a-214c are spaced such that the ambiguities in AoA resulting from the closer pair of antennas 214a, 214b are more widely spaced than the error in the TDOA angle estimate, and the ambiguities of the more distant pair of antennas (e.g, 214c and one of 214a or 214b) are spaced more widely than the error in AoA resulting from the more closely spaced pair of antennas 214a, 214b.

In certain embodiments, antenna elements 214a-214c each receive, at a common time, components of an incident RF signal wavefront 222 from a source emitter as corresponding first signal component 224a, second signal component 224b and third signal component 224c. The RF signal may comprise a pulse, a portion of a pulse, or a common time segment (if the emitter emits continuous signals.) The antenna elements 214a-214c may feed the two channel receivers 206a and 206b (and/or separate receivers may be used), which may down-convert digitize, and channelize the signals. Detected signals may be processed to extract respective signal components 224a-224c including phases φ, frequencies (expected to be the same for each incident pulse signal), times of arrival (TOA).

The path differences between the received signal components 224a-224c may be expressed as $d=s_N*\sin\theta$, where θ as shown comprises the angle formed by a line drawn from the first antenna element 214a normal to the signal path of the RF signal wavefront 222. A first closer phase difference may be determined from the first signal component 224a and second signal component 224b, and a second (distant) phase difference may be determined from the first signal component 224a and third signal component 224c. The TDOA between the first and second signal components 224a, 224c may be determined by methods such as the time difference between the leading edges of the signal components 224a and 224c, or the time offset which maximizes the correlation of the signal components 224a and 224c. The AoA is determined by the TDOA AoA calculator 218 according to $$\sin\theta = \frac{c}{s_2} * \Delta t,$$

where c is the speed of light. The phase differences may be determined in one of several well-known techniques, including finding the differences of the phases of the respective signal components 224a-224c, said phases computed using arctangent of the ratio of the in-phase (I) and quadrature (Q) components of the signal. The AoA ambiguity pattern is generated by the ambiguity generator 216 according to $$\sin\theta = \frac{\lambda}{s_N}\left(\frac{\Delta\Phi_N}{2\pi} + m\right),$$

where m is the ambiguity index and can be any integer yielding a valid sin value between −1 and 1. It is understood that TDOA and the dual baseline PI AoA measurements each contain uncertainty. With regard to TDOA error, the uncertainty is proportional to a time measurement error estimate associated with the measurement equipment, and may be empirically derived or may result from analysis of the equipment's design. The span of TDOA AoA estimates produced by TDOA calculator 218 comprises a single solution plus or minus the associated error range (which may have a Gaussian shape.) For example, the TDOA error range is proportional to the baseline distance $s_2$ and is roughly independent of pulse signal frequency, and may be expressed as $$\sigma_{\sin\theta} = \frac{c}{s_2} * \sigma_t.$$

Whereas, the uncertainty of PI solutions is due to both a phase measurement error, $$\sigma_{\sin\theta} = \frac{\lambda}{s_N}\left(\frac{\sigma_\varphi}{2\pi}\right),$$

and a modulo ($2\pi$) phase measurement uncertainty, which gives the spacing between ambiguities and may be expressed by $$\Delta_{\sin\theta} = \frac{\lambda}{s_N}. \quad (1)$$

That is, the number of possibly correct AoA solutions resulting from PI DF techniques increases with pulse frequency and decreases with antenna baseline spacing. When $s_N$ is wider than $$\frac{\lambda_{pulse}}{2},$$

the set of PI AoA estimates has $$\frac{2s_N}{\lambda}$$

ambiguous results("ambiguities"). The width of the angular measurement error is a factor of $$\left(\frac{\sigma_\varphi}{2\pi}\right)$$

smaller than the angular spacing of the ambiguities, a factor which can easily exceed 100.

FIGS. 3A through 3D illustrate flow diagrams for methods of calculating the high precision unambiguous AoA solution 210 (e.g., a singular or a small set of values) in accordance with embodiments of the disclosure. Various embodiments described here accommodate low and high phase noise conditions detected in the received RF signal(s), and alternative ambiguity information resolution approaches. The described embodiments are in no way intended to limit the scope of the disclosure.

Figure 3A:
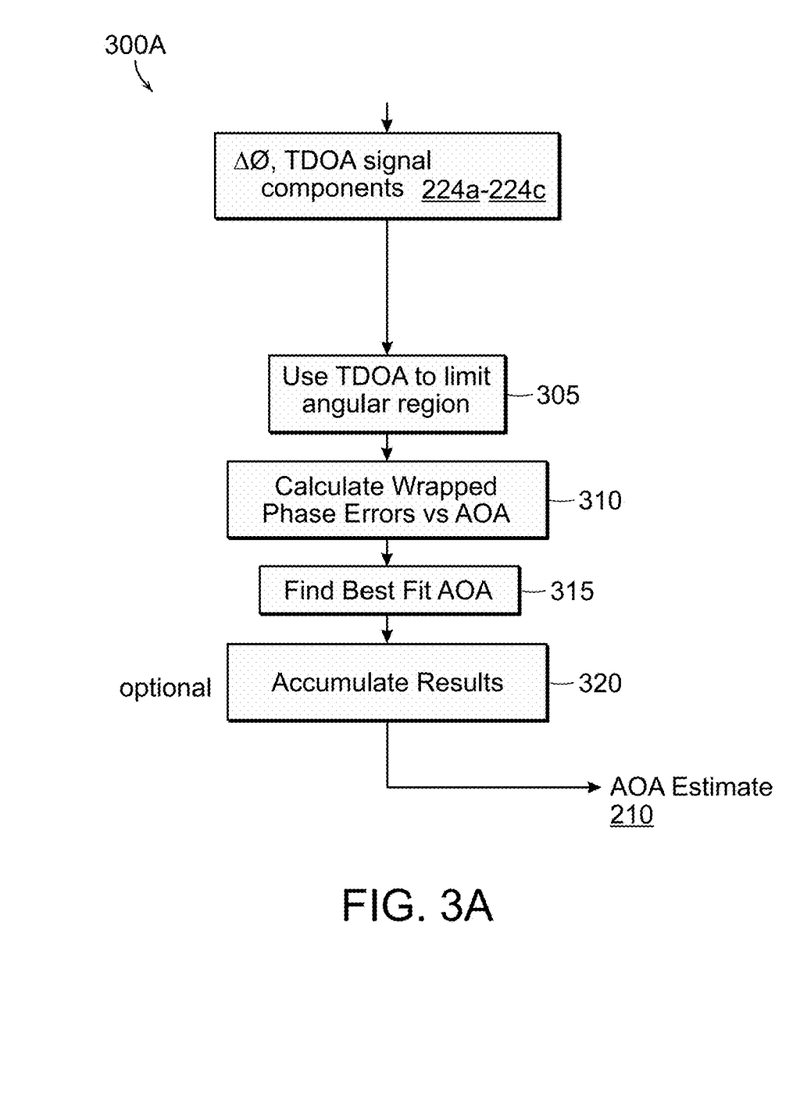
FIGS. 3A-3D are illustrations of flow diagrams of exemplary methods for improved AoA DF in accordance with embodiments of the disclosure.

FIG. 3A depicts a processing flow chart for an exemplary DF method 300A that may be utilized by signal processor 208 to determine the precise unambiguous AoA solution from signal components 224a-224c of one or more received RF signals 212 that include low phase noise. In step 305, features (e.g., TDOA, frequency, phase differences, etc.) associated with the signal components 224a-224c of the received RF signal(s) 212 may be determined. The TDOA may be measured using leading edge envelope detection for RF signals 212 that comprise simple pulsed signals, and pre-detection correlation for phase and frequency modulated signals. The AoA uncertainty for ambiguous PI AOA estimates will normally be much narrower than TDOA error ranges and appear as a set of near-discrete results.

Figure 4A:
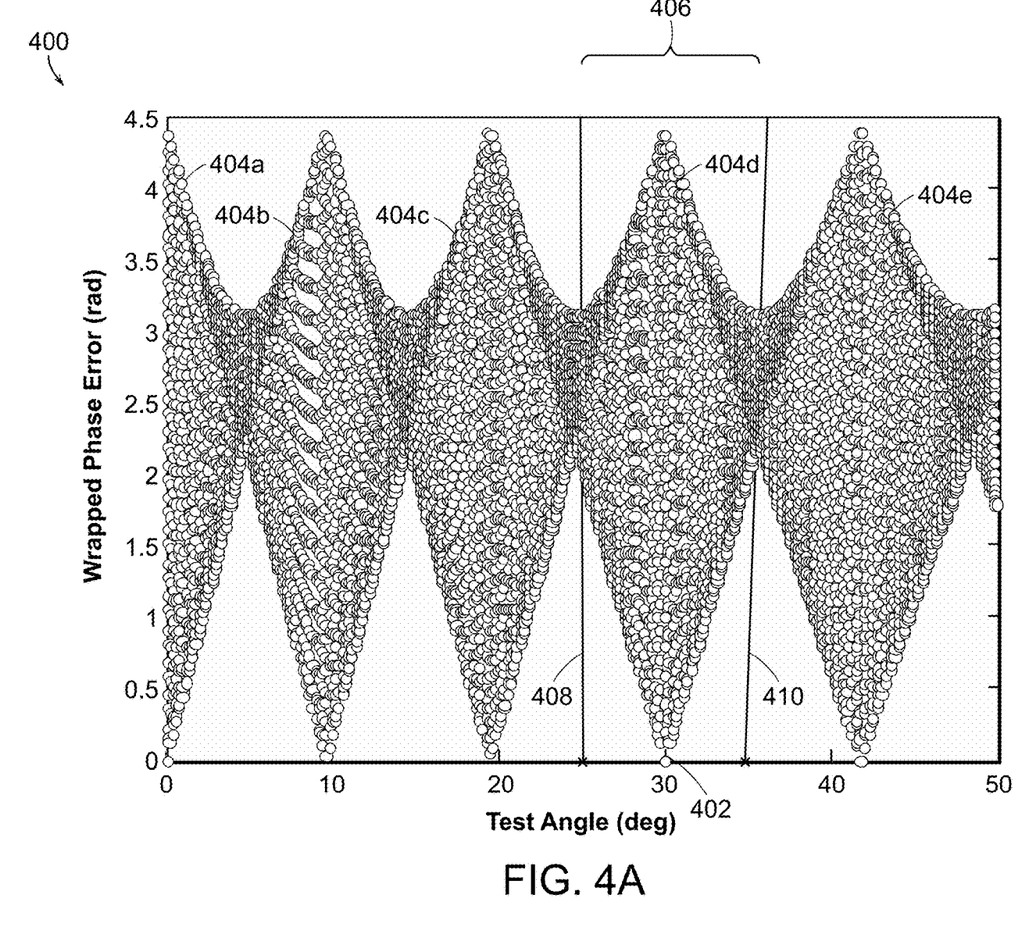
FIGS. 4A and 4B are graphs of wrapped phase error and ambiguity zones associated with an AoA DF example process.

The TDOA AoA calculator 218 determines the angular limits to be considered by the ambiguity resolver 220. An example ambiguity pattern generator 216 compares the PI phase differences calculated by the receivers 206a, 206b to calculated phase differences for a variety of hypothesized AoA to generate a net ambiguity pattern. An example net ambiguity pattern 400 is depicted in FIG. 4A which shows root sum squared (RSS) phase errors for the two antenna pairs (e.g., antenna elements 104a-104b, and 104a-104c) for each hypothesis. In this example case, the true angle 402 was 30°, and the phase error equals 0 at that 30°. Because the phase measurement is constrained to be between 0 and $2\pi$, with $2\pi$ of error being indistinguishable from 0 error, the phase error is commonly referred to as "wrapped", because $2\pi$ 'wraps' around to 0. The wrapped, net ambiguity phase error pattern 400 typically takes the form of slowly varying, diamond-shaped, phase error envelopes such as representative phase error envelopes 404a-404e, with the ambiguities in AoA plotted as a function of the wrapped phase error (the difference between the true phase error and the modulus $2\pi$ of the true phase error). At high emitter signal frequencies, and wide spacing between the antenna elements 104a-104c, dense PI AoA ambiguities may exist. The phase error envelopes 404a-404e illustrate exemplary combined PI AoA ambiguities by phase error at various solution angles, with an example 2° phase noise present in the emitter signal and test parameters of a 30° AoA at 18 GHz emitter signal and 500 cm spacing between first antenna element 104a and third antenna element 104c, and 10 cm between first antenna element 104a and second antenna element 104b.

In step 310 of method 300A, the output from TDOA calculator 218 comprises an error-dependent span of AoA angle possibilities 406. A TDOA angle calculation based on the more distant antenna element 104c and one of the other closely spaced antenna elements 104a, 104b results in the continuous range of AoA angle possibilities 406. The ambiguity resolver and signal accumulator 220 uses boundaries 408, 410 of the span of TDOA AoA angle possibilities 406 to limit the initial PI ambiguities 404a-404e (resulting from closely spaced antenna elements 104a, 104b PI measurements) to a wrapped envelope 404d within which the unambiguous precision AoA solution 210 might be determined. Dual baseline AoA ambiguities 404a-404c and 404e that do not fall within the TDOA AoA error range 406 may be disassociated from the set of possibly correct high precision AoA solutions. The TDOA AoA error range 406 represents a coarse AoA estimate comprising all of the unambiguous possible AoA solutions obtained by the TDOA DF operation. The TDOA error comprises the (measuring equipment related) error in the calculated TDOA for a given AoA and determines the boundaries 408, 410 of the TDOA AoA error range 406.

Figure 5:
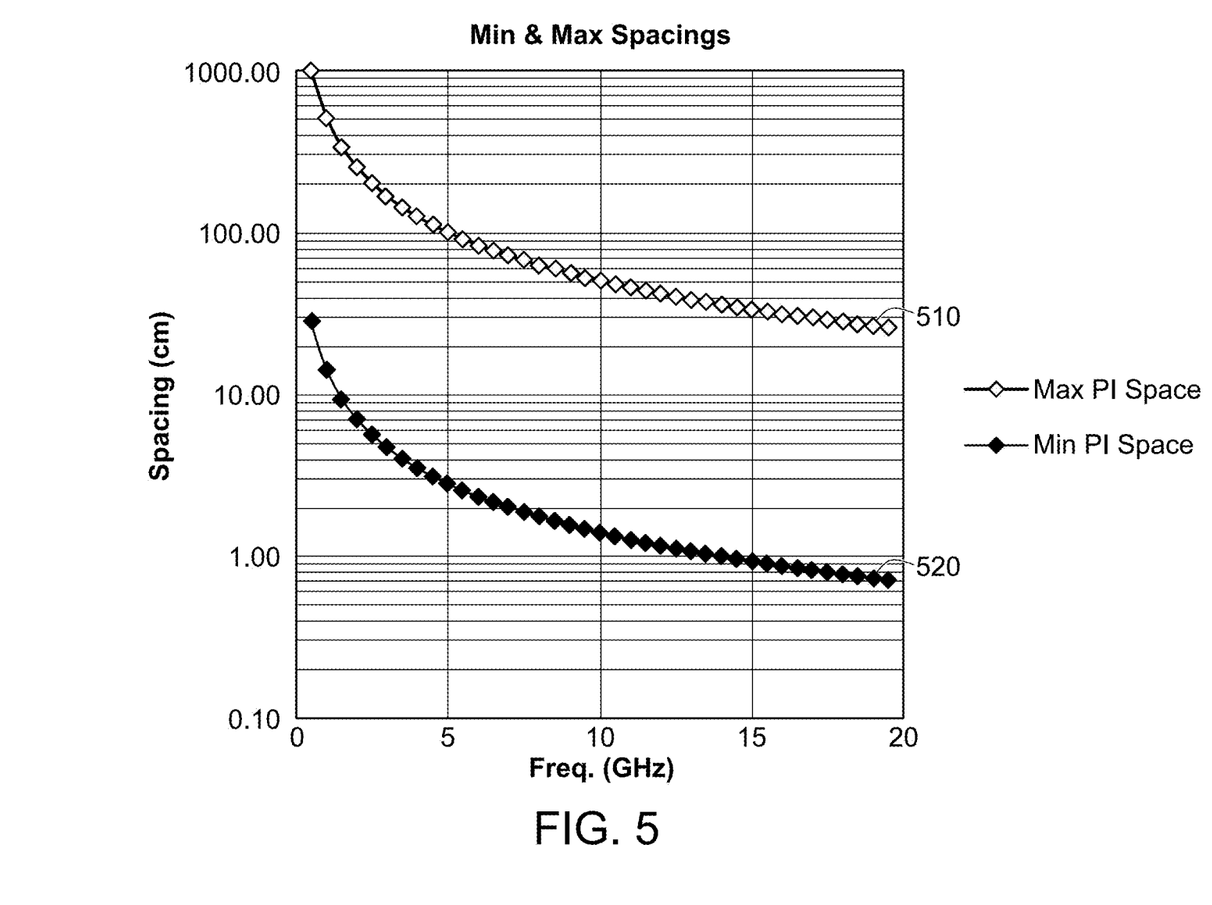
FIG. 5 is a chart of minimum and maximum antenna spacings as a function of received RF signal frequency, in accordance with an exemplary antenna array design rule.

The spacings of the dual baseline net ambiguity (diamond-like) patterns 404a-404e are dependent upon the antenna element 104a-104c spacings, so that the antenna array 202 may be configured with spacings between antenna elements 104a-104c such that the span of TDOA AoA possibilities 406 identifies one PI AoA wrapped envelope 404d associated with a particular emitter 108 of interest over a range of carrier frequencies. For example, the spacings may be selected in accordance with $$\frac{\lambda}{s_{TD}}\left(\frac{\sigma_\phi}{2\pi}\right) < \frac{\lambda}{s_{PI}}\left(\frac{\sigma_\phi}{2\pi}\right) < \frac{\lambda}{s_{TD}}, \quad (1)$$

wherein $S_{TD}$ represents the largest spacing ($S_2$ in FIG. 2) between the three antenna elements 104a-104c, $S_{PI}$ represents the smallest spacing ($S_1$ in FIG. 2) between the three antenna elements 104a-104c, $\sigma_\phi$ represents a known phase measurement error of the antenna array 202, and $\lambda$ is the wavelength of the received emitter signal components 224a-224c. FIG. 5 provides a plot of antenna element spacings $S_{PI}$ within which the precise AoA estimate 210 could be determined using a single pulse as a function of emitter signal frequency, for an exemplary antenna array with a 5 m station spacing (i.e., distance $S_{TD}$), a 1 nanosecond system time error and 10° phase error. Near the maximum $S_{PI}$ curve 510, selecting the correct precise AoA solution becomes difficult. While at the minimum $S_{PI}$ curve 520, PI techniques provide smaller accuracy improvements over TDOA AoA solutions. However, using a 10-20 cm $S_{PI}$, for example, would provide unambiguous accuracy improvements over almost all emitter signal frequencies. A 20 cm $S_{PI}$ would yield a precision of ~0.1° at 20 GHz.

Figure 4B:
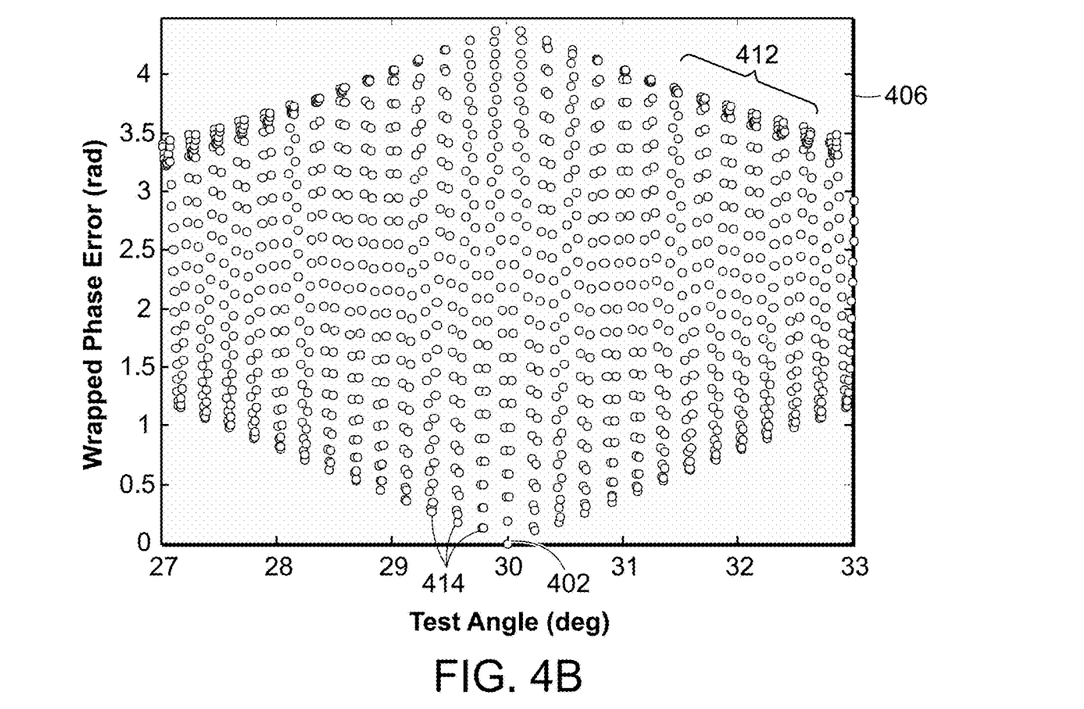
Figure 4C:
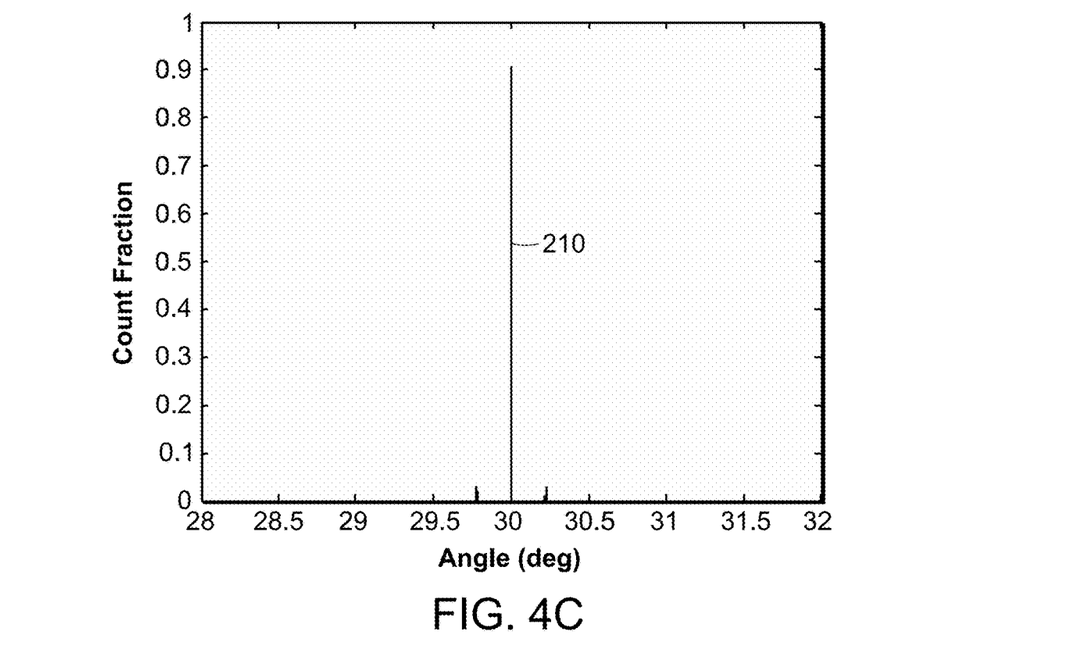
FIG. 4C is an example histogram illustrating wrapped phase error fraction per angle for two sample results in the presence of different levels of phase noise.

Referring again to FIG. 3A, in step 310, a set of wrapped phase errors are calculated for a hypothesized AoA test grid at the emitter frequency, for the bounded angular ambiguity region 406, such as shown in FIG. 4B with representative intermediate results 412 plotted as wrapped phase error against AoA test angle. In step 315, a best fit operation may be applied to the intermediate results 412 for each pulse processed, to evaluate the phase fit errors and find a best AoA for each pulse. The unambiguous AoA may be determined using a single pulse. In optional step 320, the ambiguity resolver and signal accumulator 220 may accumulate phase fit errors for a number of pulses (emitter signal acquisitions) to determine more robustly the optimal unambiguous, precision AoA estimate 210. Acquisition and processing of additional pulses may occur in a predetermined manner, or iteratively until a statistical confidence threshold is achieved, or until a determination is made that no precise AoA solution 210 is currently possible. FIG. 4C illustrates a representative histogram output of the statistics accumulation step 320, showing roughly 90% of the processed pulses indicating the correct precise AoA estimate 210 of 30°, with the others indicating very close results. Once a singular unambiguous AoA estimate 210, or a reduced set of estimates, has been obtained, signal processor 208 may report the estimate(s) as the solution.

Figure 3B:
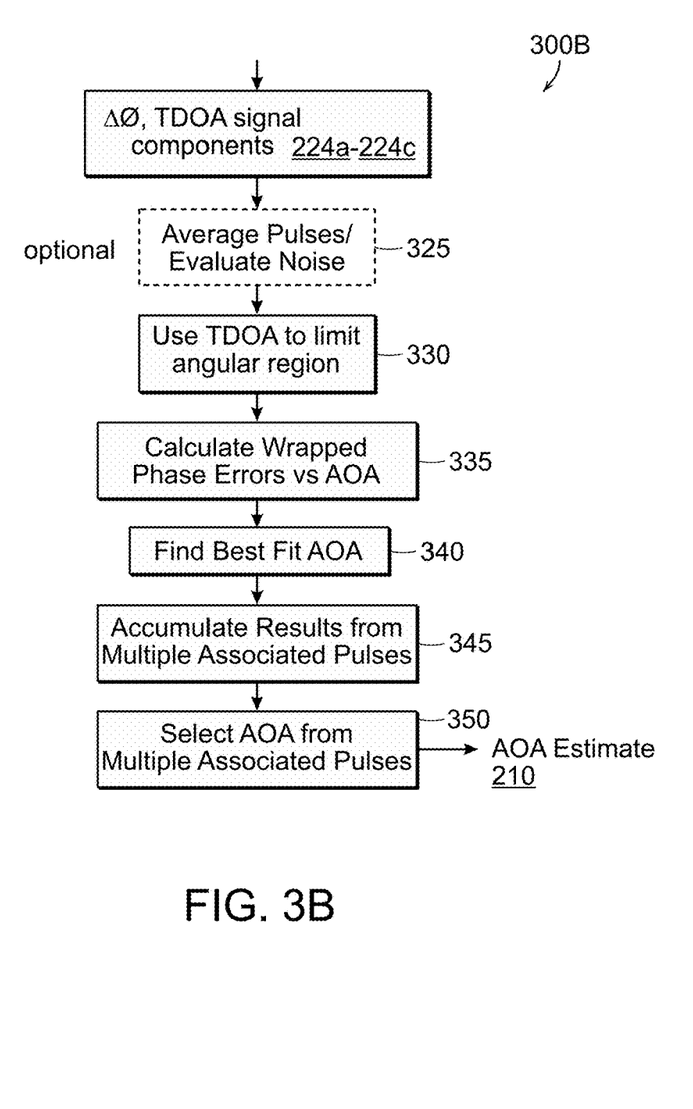

FIG. 3B depicts a processing flow chart for an exemplary DF method 300B that may be utilized by signal processor 208 to determine the precise AoA estimate 210 from received emitter signal components 224a-224c that include high phase noise. TDOA limiting step 330, wrapped error calculation step 335, and best fitting step 340 are nearly identical to corresponding steps in method 300A. However, whereas method 300A may produce an unambiguous precise AoA solution on a single, low phase noise, emitter pulse, high phase noise in the received emitter signal 212 may give rise to incorrect semi-ambiguities 414 (such as depicted in FIG. 4B). In traditional interferometers, a given phase measurement and hence phase difference may be particularly noisy causing the retrieved AoA to be in the wrong ambiguity. It is more robust to compare the AoAs retrieved from a small number (e.g 3-5) pulses to ensure consistency and to discard outliers (such as done in optional step 325) than to rely on results of an individual pulse. In very noisy scenario additional pulses or samples may be tested. The disclosed embodiments are advantageously more robust by comparing results from a small number of pulses, removing outliers, and then averaging the phase differences of those pulses that remain and recomputing a more precise AoA.

Figure 3C:
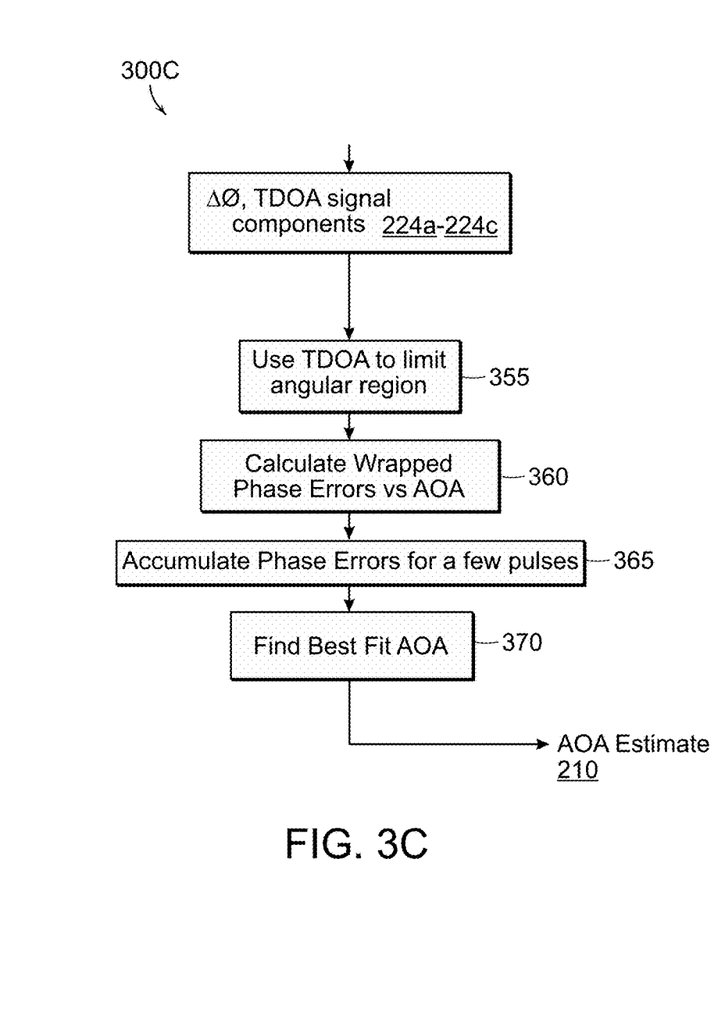
Figure 3D:
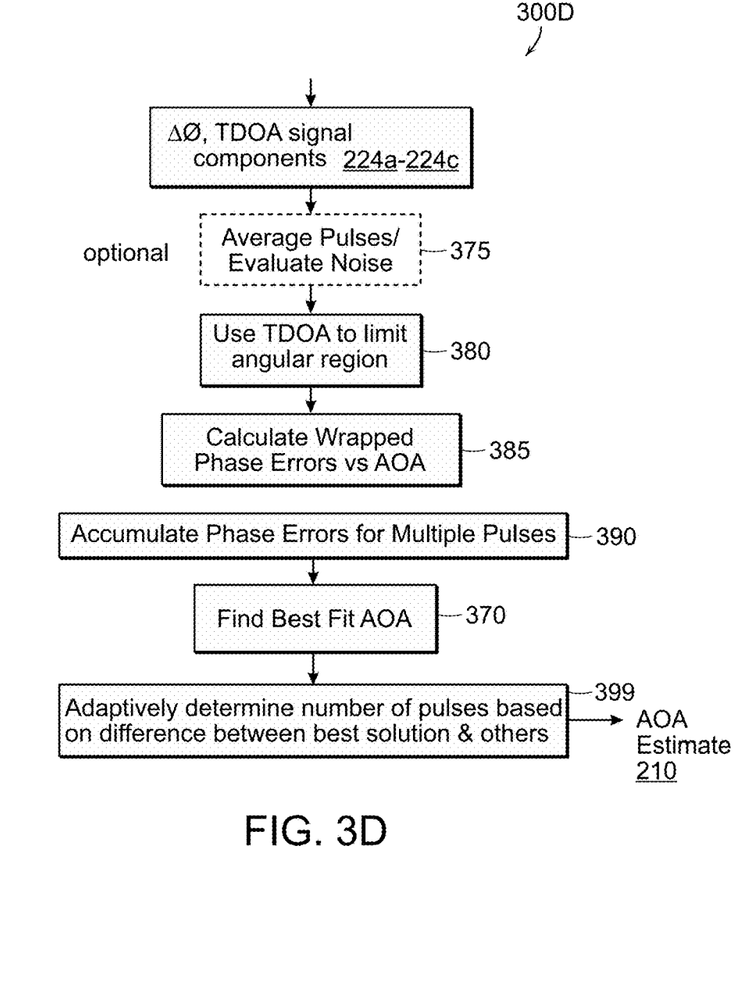

FIGS. 3C and 3D depict processing flow charts for alternative DF methods 300C and 300D, for low and high RF emitter signal 212 phase noise respectively. Steps 355, 360, 380 and 385 of methods 300C and 300D are very similar to corresponding steps of methods 300A and 300B, however in these embodiments, wrapped envelope phase fit errors are accumulated for multiple pulses (steps 365 and 390), and then a best fit AoA solution is found (steps 370 and 395). Additionally, method 300D may employ an optional step 399 for adaptively determining the number of additional emitter pulses to process, based on a difference between the best fit AoA solution and the other AoA solutions found in step 390.

Additional Embodiments

Figure 6A:
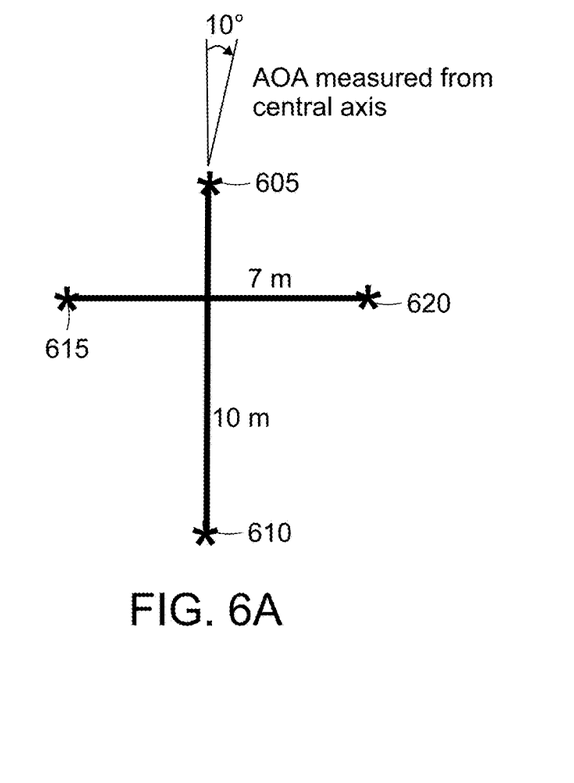
FIG. 6A is a diagram illustrating example antenna module positions relative to an aircraft, and FIG. 6B a sample plot of wrapped phase errors and test angles for the example antenna module positions.
Figure 6B:
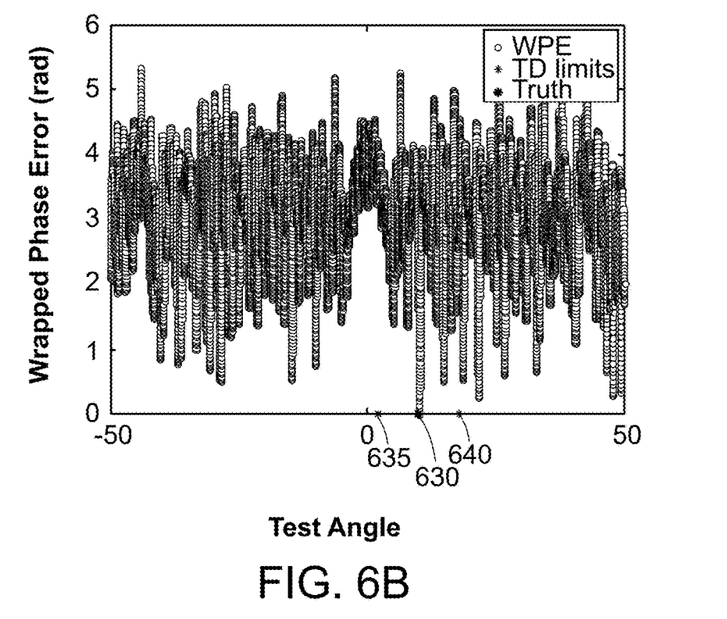

Those of skill in the art will readily appreciate that variations in the system configurations and techniques described above may be made. For example, with reference to FIGS. 6A and 6B, DF methods using four native antenna stations (at nose 605, tail 610, and wings 615, 620) positioned in quadrants of an aircraft 625 has been demonstrated to provide precise AoA solutions at most emitter AoA's and frequencies. In FIG. 6B, example results are presented for a 4-antenna element test case having an emitter signal at 10° AoA and 5 GHz, with antenna spacing 397 cm, 266 cm and 984 cm. It can be seen the minimum PI phase error 630 within the boundaries 635, 640 of TDOA AoA possibilities is centered at the true AoA 10°.

Exemplary Interface

The precision offered by the methods and systems described herein is an order of magnitude better or faster than existing DF systems. Suitable applications include passive tracking and rapid geolocation. One or more users can interface with embodiments of the DF system using any suitable display (e.g., televisions, computer monitors, laptops, tablets computing device, smart phones, personal digital assistant (PDAs) and/or other displays and computing devices, etc.) In some embodiments, system 200 and the user(s) of the system may be co-located on an aircraft. Of course, users may also be located remotely from the DF system.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. No element, act, or instruction used herein should be construed as critical or essential unless explicitly described as such. Where only one item is intended, the term "one" or similar language is used.

What is claimed is:

1. A method for determining an angle of arrival (AoA) of one or more RF signals received from an emitter at an antenna array, comprising the steps, performed by a processor, of:

receiving corresponding first, second and third components of a first signal detected at first, second and third antenna elements at a common time, the first and second antenna elements being fixedly spaced apart more closely to each other than to the third antenna element;

determining one or more features of the first signal, including a first phase difference between corresponding phases of the first and second signal components, a second phase difference between corresponding phases of the first and third signal components, and a time difference of arrival (TDOA) between the first and third signal components arriving at the first and third antenna elements, the TDOA having a known measurement error range;

performing a TDOA angle calculation using the TDOA to obtain a span of TDOA AoA possibilities centered at a solution to the TDOA angle calculation and bounded by the known TDOA measurement error range; and determining an unambiguous AoA estimate using the span of TDOA AoA possibilities and two ambiguous Phase Interferometry (PI) estimates based on the first and second phase differences and having different ambiguity spacings.

2. The method of claim 1, further comprising the steps of:

calculating an envelope of wrapped phase errors using PI based on the first and second phase differences in the received signal components, and within the range of TDOA AoA possibilities; and wherein the unambiguous AoA estimate is determined as being associated with a minimum phase error within the wrapped phase errors envelope.

3. The method of claim 1, wherein additional unambiguous AoA estimates from subsequent RF signals from the same emitter are determined in order to obtain a refined AoA solution.

4. The method of claim 1, further comprising selecting the spacings among the first, second and third antenna elements such that ambiguities in AoA resulting from the first and second signal components are more widely spaced than errors in the TDOA angle calculation, and ambiguities in AoA resulting from the first and third signal components are spaced more widely than the errors in a single AoA estimate resulting from the first and second signal components.

5. The method of claim 1, further comprising selecting the antenna spacings among the first, second and third antenna elements in accordance with $$\frac{\lambda}{s_{TD}}\left(\frac{\sigma_\phi}{2\pi}\right) < \frac{\lambda}{s_{PI}}\left(\frac{\sigma_\phi}{2\pi}\right) < \frac{\lambda}{s_{TD}} \qquad (1)$$

wherein $S_{TD}$ represents the largest spacing between any two of the first antenna element, second antenna element, and third antenna elements, $S_{PI}$ represents a smallest spacing between any two of the first antenna element, second antenna element, and third antenna elements, $\sigma_\varphi$ represents a known phase measurement error of the antenna array, and $\lambda$ is the wavelength of the received signal components.

6. The method of claim 1, wherein the first and second antenna elements are fixedly positioned in a first quadrant of a moveable platform, and the third antenna element is fixedly positioned in a second quadrant of the moveable platform.

7. A system for determining an angle of arrival (AoA) of one or more RF signals received from an RF emitter, comprising:

a processor configured to receive corresponding first, second and third components of a first signal detected at first, second and third antenna elements at a common time, the first and second antenna elements being fixedly spaced apart more closely to each other than to the third antenna;

determine one or more features of the first signal, including a first phase difference between corresponding phases of the first and second signal components detected at the first and second antenna elements, a second phase difference between corresponding phases of the first and third signal components detected at the first and third antenna elements and a time difference of arrival (TDOA) between the signal components arriving at the first and third antenna elements, the TDOA having a known measurement error range;

perform a TDOA angle calculation using the TDOA to obtain a range of TDOA AoA possibilities centered at a solution to the TDOA angle calculation and bounded by the known TDOA measurement error range; and determine an unambiguous AoA estimate using the span of TDOA AoA possibilities and two ambiguous PI estimates based on the first and second phase differences and having different ambiguity spacings.

8. The system of claim 7, wherein the processor is further configured to:

calculate an envelope of wrapped phase errors using PI based on the first and second phase differences in the first, second and third signal components, and within the span of TDOA AoA possibilities;

wherein the unambiguous AoA estimate is determined as being associated with a minimum phase error within the wrapped phase errors envelope.

9. The system of claim 7, wherein the first, second and third antenna elements are spaced apart in accordance with $$\frac{\lambda}{s_{TD}}\left(\frac{\sigma_\phi}{2\pi}\right) < \frac{\lambda}{s_{PI}}\left(\frac{\sigma_\phi}{2\pi}\right) < \frac{\lambda}{s_{TD}} \qquad (1)$$

wherein $S_{TD}$ represents the largest spacing between any two of the first, second, and third antenna elements, $S_{PI}$ represents the smallest spacing between any two of the first, second, and third antenna elements, $\sigma_\varphi$ represents a known phase measurement error of the antenna array, and $\lambda$ is the wavelength of the received signal components.

10. The system of claim 7, wherein the first and second antenna elements are fixedly positioned in a first quadrant of a moveable platform, and the third antenna element is fixedly positioned in a second quadrant of the moveable platform.

* * * * *